United States Patent
Malas et al.

(10) Patent No.: US 7,440,455 B2
(45) Date of Patent: Oct. 21, 2008

(54) REGISTRATION OF MULTIPLE VOIP DEVICES

(75) Inventors: Daryl William Malas, Broomfield, CO (US); Richard D. Terpstra, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 280 days.

(21) Appl. No.: 11/315,644

(22) Filed: Dec. 22, 2005

(65) Prior Publication Data

US 2007/0147356 A1    Jun. 28, 2007

(51) Int. Cl.
    *H04L 12/28* (2006.01)
(52) U.S. Cl. .................. 370/389; 455/404.1; 379/45
(58) Field of Classification Search ............. 379/90.03, 379/90.09, 100.15, 45; 370/352, 356, 389; 455/404.1
    See application file for complete search history.

(56) References Cited

U.S. PATENT DOCUMENTS

| | | | | |
|---|---|---|---|---|
| 6,526,272 B1 * | 2/2003 | Bansal et al. | ............... | 455/406 |
| 6,985,961 B1 * | 1/2006 | Ramsayer et al. | ........... | 709/238 |
| 2002/0131596 A1 * | 9/2002 | Boeckeler | ................... | 380/252 |
| 2003/0033418 A1 * | 2/2003 | Young et al. | ................ | 709/230 |
| 2004/0213210 A1 * | 10/2004 | Dube et al. | ................. | 370/352 |

OTHER PUBLICATIONS

Sibley, C., et al.; IP PBX/Service Provider Interoperability; Recommendation-Draft; Aug. 2005; pp. 1-49; The SIP Forum (2005).

* cited by examiner

*Primary Examiner*—Olisa Anwah
(74) *Attorney, Agent, or Firm*—Hensley Kim & Holzer, LLC

(57) ABSTRACT

A calling network capable of accepting voice and data information includes a voice distribution server, wherein the voice distribution server is communicably coupled to an integrated access device, wherein the voice distribution server is associated with a computer readable medium, and wherein the computer readable medium includes a customer profile; and wherein the customer profile includes at least one registered access number associated with the integrated access device, and at least two quasi-registered access numbers associated with the integrated access device. A method for registering multiple voice communication devices in relation to a Voice Over IP network includes providing a voice distribution server communicably coupled to an integrated access device and is associated with a computer readable medium that includes a customer profile having at least one registered access number associated with the integrated access device, and at least two quasi-registered access numbers associated with the integrated access device.

20 Claims, 9 Drawing Sheets

REGISTRATION OF MULTIPLE VOIP DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2005 Level 3 Communications, Inc.

TECHNICAL FIELD

Embodiments of the present invention generally relate to systems and methods for registering multiple voice over Internet protocol (VoIP) devices, and more specifically for registering multiple VoIP devices associated with a set of multiple, possibly discontiguous, numerical VoIP identifiers.

BACKGROUND

In the field of telecommunications, communications devices often must be registered on the communications network in order to make calls and to be called. For example, on a voice over Internet protocol (VoIP) network, using a session initiation protocol (SIP), VoIP devices (e.g., terminal adapters and VoIP phones) register themselves periodically with a network registrar by essentially identifying themselves and/or their network locations. Later, when a caller calls the VoIP device, the registrar determines where the called device is for call routing purposes. Registration of single VoIP devices (e.g., personal home devices) is a relatively straight-forward process. However, larger entities, such as large corporations, can include numerous (e.g., thousands) VoIP devices, which all must be registered periodically. Registration of each of the VoIP devices in such large entities using traditional methods can be complex and create network bottlenecks, which can result in low-quality performance.

Conventional methods and systems for registering multiple VoIP devices of a large organization involve identifying the devices to a traditional VoIP Integrated Access Device (IAD). Traditionally, IADs register each device individually by generating a register message on behalf of each device. Each register message includes identification information specific to the associated device, such as the device's phone number and/or IP address. A traditional IAD will typically attempt to register all the VoIP devices with individual register messages being issued for each telephone number. In the case of large organizations, such a process can be time-consuming, cumbersome and require unnecessary overhead or duplication of effort. In addition, generally when an IAD rapidly registers on behalf of each of many individual telephone numbers, undesirable "bursty" network performance can result.

Thus, there is a need to register multiple network devices that may be associated with an organization of multiple devices, in such a way as to minimize complexity and adverse network performance.

SUMMARY

Embodiments described herein facilitate registration of multiple voice communications devices on a communications network.

An embodiment of a calling network includes a voice distribution server communicably coupled to an integrated access device and associated with a computer readable medium having a customer profile that includes at least one registered access number associated with the integrated access device, and at least two quasi-registered access numbers associated with the integrated access device. At least one of the quasi-registered access numbers may be discontiguous from another one of the quasi-registered access numbers.

The quasi-registered access numbers may be associated with respective ones of a plurality of voice communication devices. The integrated access device may be communicably coupled to a plurality of voice communication devices and be associated with another computer readable medium that includes instructions executable by the integrated access device to register the plurality of voice communication devices with the calling network using a unified registration request.

In an embodiment, the customer profile includes an integrated access device identification, and a plurality of access numbers associated with the integrated access device. The customer profile may further include at least one element selected from the group consisting of a customer description, routing information, caller-id information, and a emergency call configuration.

The computer readable medium may further include instructions executable to route a call directed to one or more of the quasi-registered access numbers. The routing option may be selected from a group consisting of primary always option, active/standby option, round robin option, and PSTN route advance option. The instructions executable may be executable to receive a call directed to one of the quasi-registered access numbers, identify a customer profile associated with the quasi-registered access number, access the identified customer profile, access an integrated access device identification from the customer profile, update a destination field with the integrated access device identification, and route the call to the integrated access device identified by the integrated access device identification. The instructions may be further executable to update the contact field with the original contents of the destination field.

In another embodiment the instructions may be executable to receive a call that indicates one of the plurality of quasi-registered access numbers in the origination field, insert the integrated access device identification in the origination field, insert the quasi-registered access number in the routing field, send an invitation message with an authorization header and identification in the invitation message, determine in the voice distribution server which customer profile is associated with the quasi-registered access number, access the customer profile, verify a username and password associated with the customer profile, follow the caller-id preference designated by the customer profile, determine if the call is an emergency call, follow emergency call configuration indicated in the customer profile if the call is an emergency call, send a trying message to the integrated access device, change the origination field and remote party identification field if necessary, send an adapted invitation message, and continue with a standard call flow.

An embodiment of a system for converging voice and data information for distribution on an IP network includes an integrated access device communicably coupled to a plurality of voice communication devices and associated with a computer readable medium including instructions executable by the integrated access device to register the plurality of voice communication devices with a calling network using a unified registration request. The computer readable medium is a first computer readable medium, and wherein the IP network includes a voice distribution server that is communicably coupled to the integrated access device and is associated with a second computer readable medium including a customer profile that images the integrated access device.

In one embodiment, the customer profile includes an integrated access device identification and a plurality of access numbers associated with respective voice communication devices communicably coupled to the integrated access device. The unified registration request may include an integrated access device identification, in which the integrated access device identification designates the integrated access device, and an indicator of the voice distribution server, in which the voice distribution server is operable to execute the registration request.

In some embodiments, the system further includes a second integrated access device, wherein the second integrated access device is communicably coupled to at least a subset of the plurality of voice communication devices, wherein the second integrated access device is associated with another computer readable medium that includes instructions executable by the second integrated access device to register at least the subset of the plurality of voice communication devices with the calling network using a unified registration request.

In yet other embodiments, the integrated access device is communicably coupled to a firewall that separates the integrated access device from a voice distribution server. The integrated access device may be communicably coupled to a router that separates the integrated access device from a network boundary.

An embodiment of a method includes providing a voice distribution server that is communicably coupled to an integrated access device and is associated with a computer readable medium that includes a customer profile having at least one registered access number associated with the integrated access device, and at least two quasi-registered access numbers associated with the integrated access device. The method further includes registering the customer profile associated with the integrated access device, which is associated with an integrated access device identification. The method further includes receiving a call directed to one of the quasi-registered access numbers, identifying a customer profile associated with the quasi-registered access number, accessing the identified customer profile, accessing an integrated access device identification from the customer profile, updating a destination field with the integrated access device identification, and routing the call, according to a routing preference indicated in the customer profile, to the integrated access device identified by the integrated access device identification. The method may further include updating the contact field with the original contents of the destination field.

Some embodiments of a method include receiving a call indicating one of the plurality of quasi-registered access numbers in the origination field, inserting the integrated access device identification in the origination field, inserting the quasi-registered access number in the routing field, sending an invitation message with an authorization header and identification in the invitation message, determining in the voice distribution server which customer profile is associated with the quasi-registered access number, accessing the customer profile, verifying a username and password associated with the customer profile, following the caller-id preference designated by the customer profile, determining if the call is an emergency call, following emergency call configuration indicated in the customer profile if the call is an emergency call, sending a trying message to the integrated access device, changing the origination field and remote party identification field if necessary, sending an adapted invitation message, and continuing with a standard call flow.

A more complete understanding of various embodiments of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
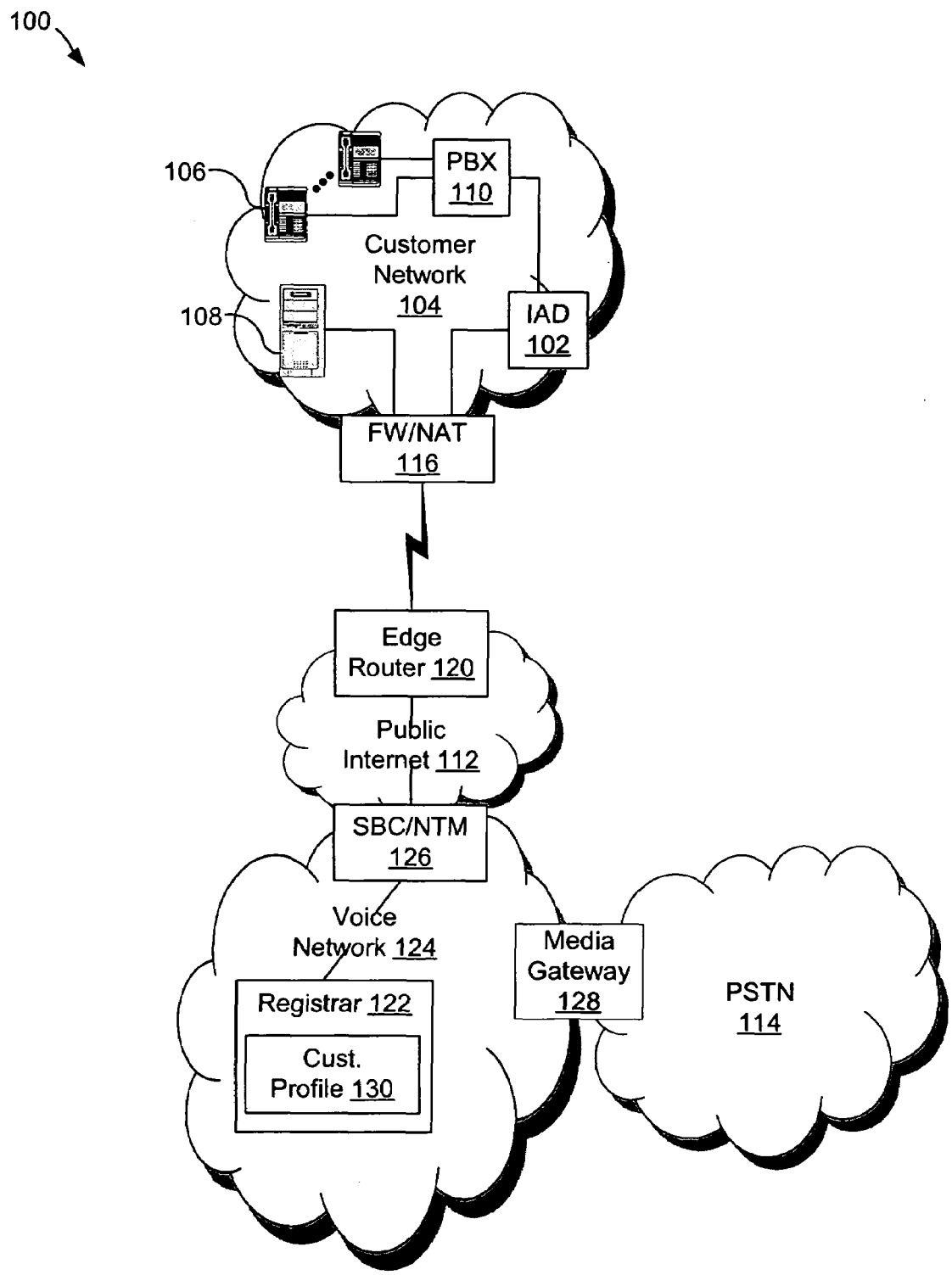
FIG. 1 illustrates an exemplary network configuration in which an integrated access device may be used in accordance with embodiments of the present invention.

Embodiments of the present invention generally relate to systems and methods for registering multiple voice over Internet protocol (VoIP) devices, and more specifically for registering multiple VoIP devices associated with a set of multiple, possibly discontiguous, numerical VoIP identifiers.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms, abbreviations, and phrases used throughout this application are given below.

The term "integrated access device (IAD)" generally refers to a device that is associated with multiple voice communications devices, and facilitates registration of the multiple voice communications devices on a communications network. An IAD may be implemented in one or more server computers with one or more databases, or other computing devices with associated memory.

The term "access number" refers to a number associated with a network-based device, such that the number can be used to access the associated network-based device.

The term "quasi-registered access numbers" refers to numbers associated with respective ones of a plurality of voice communication devices.

The term "unified registration request" generally refers to a single request to register multiple voice communication devices.

The term "customer profile" generally refers to a dynamic or static set of data associated with an entity that utilizes network services, such as communications services. The data may be descriptive of aspects of the customer's communications service. By way of example, but not limitation, a customer profile may include a customer description, routing information, caller-id information, and a emergency call configuration.

The term "network boundary" refers to a logical division point between two networks. Thus, by way of example, but not limitation, a network boundary may exist between a private local area network (LAN) and the public Internet. One or more devices may exist at a network boundary to perform various functions such as security, network address translation, or routing. By way of example, but not limitation, a firewall may exist at a network boundary between a LAN and the public Internet.

The term "discontiguous" is descriptive of a set of numerical identifiers, which, when ordered, include at least one pair of adjacent identifiers that are not consecutive. Thus, by way of example, but not limitation, the following set of telephone numbers is discontiguous: {303-888-1000, 303-888-1001, 303-888-1002, 303-888-1010, 303-888-1011}. In the foregoing example, 303-888-1002 and 303-888-1010 are not consecutive, and thus, the numerical identifiers are discontiguous.

The terms "connected" or "coupled" and related terms are used in an operational sense and are not necessarily limited to a direct physical connection or coupling. The term "communicably coupled" refers to connection or coupling that allows for communication.

The term "voice communication device" generally refers to any device that enables voice communication over a network. Thus, by way of example, but not limitation, voice communication devices include cell phones, VoIP phones, traditional telephones, communications-enabled handheld computing devices, or communications-enabled personal digital assistants.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "endpoint" can be a logical location on a communication network such that communications ongoing in relation to the logical location can be targeted, a physical location such that communications emerging from the geographic location are targeted, and/or an individual or entity such that communications associated with the individual or entity are targeted.

The term "computer readable media" refers broadly to any available media that can be accessed by a computing device. By way of example, but not limitation, computer readable media may include "computer storage media" and "communications media". The term "computer storage media" includes volatile and non-volatile, removable and non-removable media implemented in any technology for storage of information. The term "communications media" refers to modulated data signal(s) that has computer readable data embodied therein. Communication media can include wired media and/or wireless media.

A "communicator" is used in its broadest sense to include endpoints and/or communication devices. Thus, a communicator can be a location (physical or logical) where a transmission is sent to/from, an entity or individual associated with communications, and/or a communication device capable of receiving and/or sending such transmissions. In some cases, transmissions can be real time transmissions including, but not limited to, video, audio, chat rooms, instant messaging, combinations of the aforementioned, and/or the like.

The phrase "communication network" or term "network" generally refers to a group of interconnected devices capable of exchanging information. A communication network may be as few as several personal computers on a Local Area Network (LAN) or as large as the Internet, a worldwide network of computers. As used herein "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Exemplary Operating Environment

FIG. 1 illustrates an operating environment 100 including an integrated access device (IAD) 102 in accordance with various embodiments of the present invention. The IAD 102 is associated with an organization, company, or other entity that has a communications network 104 that supports voice and data communications among multiple voice communications devices 106 and computing devices, such as server 108. One or more facsimile (fax) machines (not shown) may also be included on the network 104. In embodiments described herein, the entity related to the network 104 is considered a customer of a voice network service provider. Thus, the network 104 may be referred to as a customer network 104.

The multiple communications devices 106 and fax machines are communicatively coupled to a private branch exchange (PBX) 110, which is an organization-based switch. PBX 110 allows device 106 users to set up voice calls (or data, for fax machines) among other users in the same company or to set up calls across a public Internet 112 and/or the public-switched telephone network (PSTN) 114. People calling into the company can dial a single number and the PBX 110 can route the call to the appropriate extension. Internal users have a number of outgoing lines for making calls over the public Internet 112 and/or the public-switched telephone network (PSTN) 114. By connecting internal users with other internal users, the PBX 110 avoids the need for an internal call to be set up across the public Internet 112 and/or the public-switched telephone network (PSTN) 114.

Data received by, and transmitted from, the customer network 104 passes through a firewall (FW) and/or network address translator (NAT) 116. FW/NAT 116 typically performs routing, network address translation (NAT), and other security functions, such as encryption, decryption, virus protection, etc. Server 108 is typically communicatively coupled to a local area network (LAN) 118, within the customer network 104. LAN 118 may be wired or wireless or any combination thereof.

Voice data and other data on the public Internet 112 go through one or more edge routers 120, and is then routed across the Internet 112 to the proper destination. For example, registration data, discussed further below, is communicated from the IAD 102 to a registrar 122 at a voice services network 124. The voice services network 124 is provided by a voice services network provider, such as LEVEL3 COMMUNICATIONS, INC. Data entering and exiting the voice services network 124 passes through one or more session border controllers (SBC) and/or NAT traversal managers (NTM) 126. As will be known by those skilled in the art, data may also pass through one or more central routing authorities, such as core proxy servers (CPS) (not shown) or core routing engines (CREs) (not shown), in the voice services network 124.

The public Internet 112 and the voice services network 124 communicate data in a standard Internet protocol (IP), which is packet-based. Packets are routed across the Internet 112 and the voice services network 124 via routers (not shown). Calls can be established from the organization's communication network 102 to and from user's of the PSTN 114 via a media gateway 128. In general, media gateway (MG) 128 translates data from an IP format into a protocol used by the PSTN 114, and vice versa. In general, MG 128 may include a media gateway controller and signaling system 7 (SS7) interface. Typically, calls across the PSTN 114, follow the SS7 protocol. In some embodiments, MG 128 can perform other functions, such as data monitoring and status reporting.

Examples of voice communications devices 106 include, but are not limited to, Internet phones, and Voice over IP (VoIP) phones or terminals. Voice communications devices 106 are able to communicate over the Internet 112 and the voice services network 124 via a protocol, such as session initiation protocol (SIP) or media gateway control protocol (MeGaCo). Voice communications devices 106 register with the voice services network 124 so that calls can be routed to and from the voice communications devices 106. Registration generally involves identifying the voice communications device 106. In a SIP protocol environment, registration is accomplished by sending a SIP register message to the registrar 122.

With further reference to the registrar 122, the registrar 122 may be implemented with one or more servers (e.g., proxy servers), and one or more databases that include registration information and functionality. The registrar 122 may also be referred to as a voice distribution server. The registrar 122 can provide registration information for purposes of routing calls. In some embodiments, the registrar 122 serves as a proxy in establishing calls. For example, in some situations, during call setup the registrar 122 may change signaling header information to indicate a caller identification that is different from the actual calling device. The registrar 122 can provide routing information to a central routing authority based on customer profile information.

In embodiments described herein, one or more IADs 102 register all the voice communications devices 106 of the organization using an advantageous bulk registration process. In general, the IAD 102 is registered and is associated with the voice communications devices 106. Special data structures and processes used by the IAD 102 and the registrar 122 allow for calls to be established with each voice communications device 106, without requiring each voice communications device 106 to independently register. In this regard, individual communications devices 106 are registered using quasi-registered access numbers. In addition, the bulk registration carried out by the IAD 102 can simultaneously register multiple devices 106, even if the numerical identifiers (e.g., phone numbers, IP addresses) for those devices 106 are discontiguous. IAD 102 registration is discussed in further detail below.

An embodiment of the registrar 122 includes a customer profile 130. The profile may be designed as a single repository for customer specific information. The customer profile 130 is useful for associating routing and telephony feature content with a single customer in a multi-customer environment. The customer profile 130 can be populated from information transmitted from IAD 102. In accordance with one embodiment, the customer profile 130 contains the following information:

Unique IAD Tag
Username and Password
Telephone number information
Customer Delivery Method
Caller-id configuration
911 configuration
Customer description The unique tag identifies the source of the signaling. The IAD tag is unique to the customer's IAD 102. In some embodiments, the first number in an associated telephone number (TN) range for the customer is selected to be the IAD tag. However, the IAD tag does not need to be the first number in the customer's TN range. For example, a customer may have a contiguous TN range of (720) 888-1000-(720) 888-1999. In this example, the IAD tag could be any number in the range, but in a particular implementation, the first number in the range (i.e., 7208881000) is used as the IAD tag.

To illustrate how the IAD tag may be used in practice, in a SIP protocol environment, the IAD tag can be inserted in the user portion of the "From" field of an INVITE and REGISTER message. The following are examples of these two types of messages. In actual operation, invite and register messages typically include more information than that shown below; however, for illustrative purposes, some of the signaling variables are not shown in order to emphasize the most relevant portions of the messages. In the following examples, LEVEL3 COMMUNICATIONS, INC. is considered to be the customer, for illustrative purposes only. The IAD tag is shown in bold:

REGISTER:

REGISTER sip:64.156.41.130:5060 SIP/2.0
Method: REGISTER
From: "Level 3 Broomfield"
    <sip:7208881000@64.156.41.130:5060;user=phone>
To: <sip:7208881000@64.156.41.130:5060;user=phone>
Call-tag: 94512fa0-6904-515472-30928383-136903408200069301010000-0@10.1.69.127
CSeq: 1 REGISTER
Contact: <sip:7208881000@10.1.69.127:5060;transport=UDP;
    user=phone>
Expires: 30
Content-Length: 0

INVITE:

INVITE sip:+130305551212@65.56.80.213:5060 SIP/2.0
Via: SIP/2.0/UDP 65.56.80.120:5060;branch=z9hG4bK23C0
From: "Level 3 Broomfield"<sip:7208881000@65.56.80.120>;tag=4CE929B2-11F1
To: <sip:+13035551212@65.56.80.213>
Call-tag: 2863539E-2E4811D9-8538800A-F8254F9C@65.56.80.120
User-Agent: Cisco-SIPGateway/IOS-12.x
CSeq: 101 INVITE
Expires: 300
Content-Length: 226

Referring again to the exemplary elements (shown above) of the customer profile 130, the variables "username" and "password" may be used to authenticate a customer. To illustrate, in a SIP protocol environment, INVITE and REGISTER messages can be authenticated with the username and password. Upon receipt of an INVITE or REGISTER message, the registrar 122 may optionally issue a "401 Unauthorized" message to the IAD 102. If the Unauthorized message is issued, the IAD 102 will respond with the username and password in an "Authorization" header of a challenge/response message. The password is sent and stored in an encrypted format in the proxy. In some embodiments, the password are encrypted and/or hidden. Data flow control during registration is discussed in further detail below.

With further regard to customer profile 130 telephone information, in one embodiment, the telephone information follows "E.164" standards. The numbers can include single 11-digit and ranges of numbers. For example, the telephone information may contain numbers such as, but not limited to, the following:
    +17208881000-+17208881999
    +17205671342
    +13038475511
    +17205671900-+17205671999

The Customer Delivery Method of the customer profile 130 includes routing information. The routing information designates the path for an inbound call from the voice services network 124 going to the customer's IAD 102. In one embodiment, the customer delivery method does not provide routing information for calls outbound from the IAD 102 to the voice network 124. In other embodiments, the customer delivery method could be adapted to specify both inbound routing and outbound routing parameters.

The routing option specified by the Customer Delivery Method is a key element of the customer profile 130. The routing option defines the path for voice signaling packets traveling to the customer's IAD. The routing option would allow unique dial plans for each customer for intra-customer dialing. Traditionally, such intra-customer dialing has been accomplished by PBX to PBX tie-lines and intra-PBX dial plans, for example using a 5-digit dialing, or prefix dialing to distinguish a site uniquely on the voice network.

In one embodiment, the customer delivery method of the customer profile includes the following routing options: Primary Always, Active/Standby, Round Robin, PSTN Route Advance. FIG. 1 illustrates a configuration that is appropriate for using the Primary Always option. The primary always option assumes a single destination IAD for all signaling. For example, as illustrated in FIG. 1, this routing option applies to a customer with a single site 104 and IAD 102. Voice signaling will always be sent to this IAD 102. In the SIP protocol, upon IAD 102 failure or loss of connectivity to the customer, a 503 message should be sent from the registrar 122 to the originating signaling point. For Q.931 signaling, the IAD 102 should respond with a 3 message (No route to destination) to the PBX 110. Such a situation will result in a fast busy response to the calling station 106. The following is an example of the REGISTER message for the primary always routing option:

Primary IAD 202

REGISTER sip:64.156.41.130:5060 SIP/2.0
Method: REGISTER
From: "Level 3 Broomfield"
    <sip:7208881000@64.156.41.130:5060;user=phone>
To: <sip:7208881000@64.156.41.130:5060;user=phone>
Call-tag: 94512fa0-6904-515472-30928383-
    136903408200069301010000-0@10.1.69.127
CSeq: 1 REGISTER
Contact:
<sip:7208881000@10.1.69.127:5060;transport=UDP;user=phone>
Expires: 30
Content-Length: 0

Figure 2:
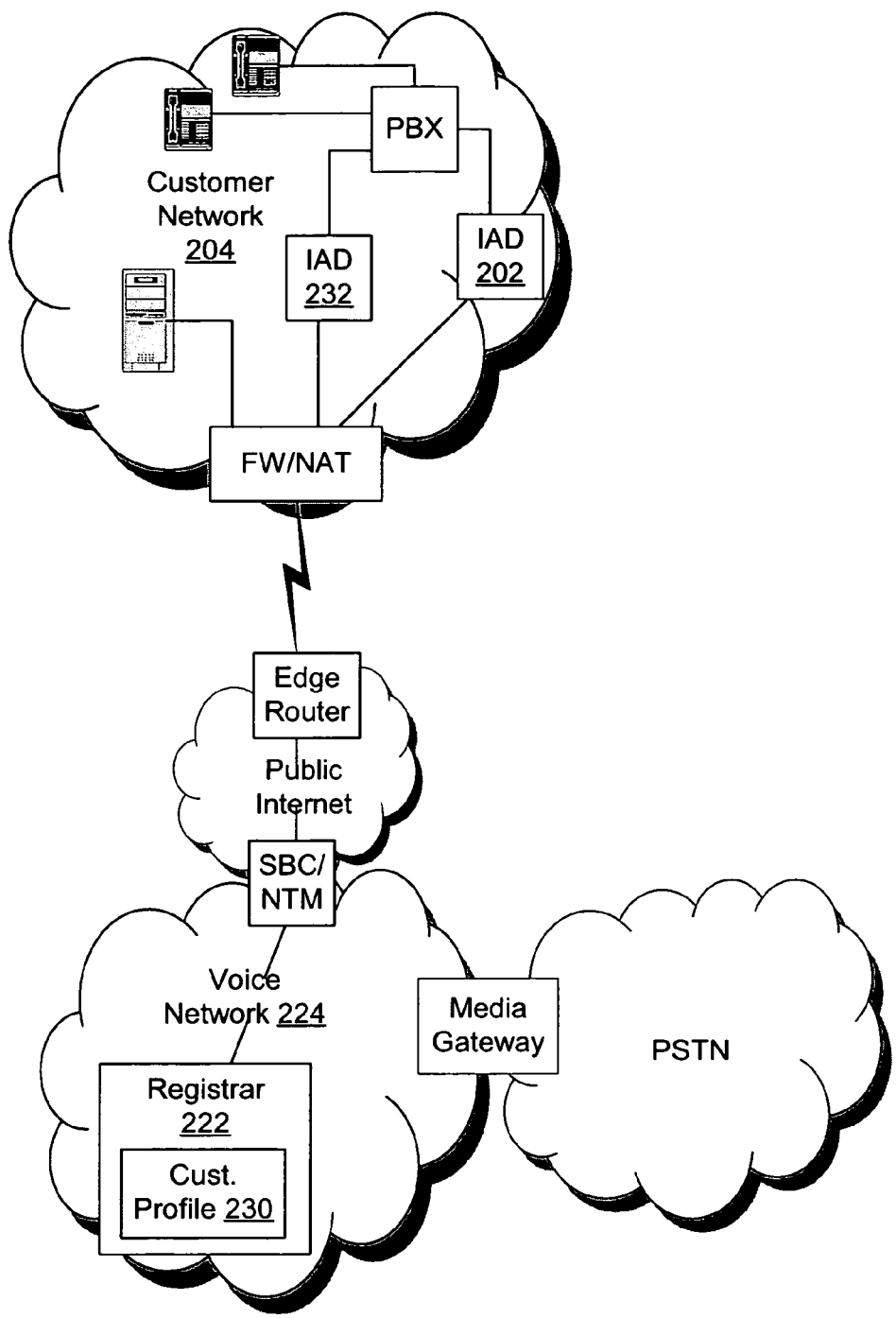
FIG. 2 illustrates another exemplary network configuration in which multiple integrated access devices at a single site may be used in accordance with embodiments of the present invention.
Figure 3:
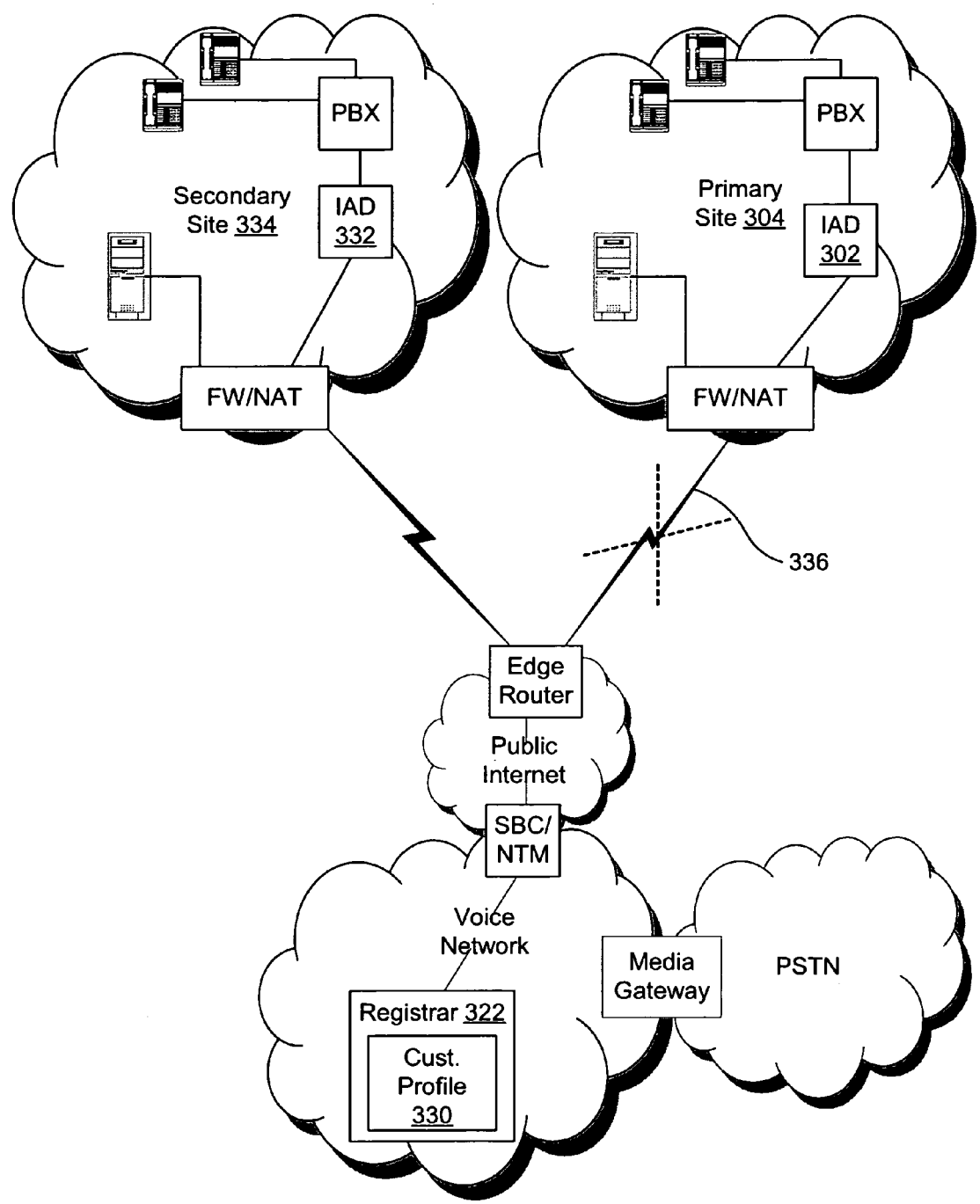
FIG. 3 illustrates yet another exemplary network configuration in which an integrated access device located at each of multiple sites may be used in accordance with embodiments of the present invention.
Figure 4:
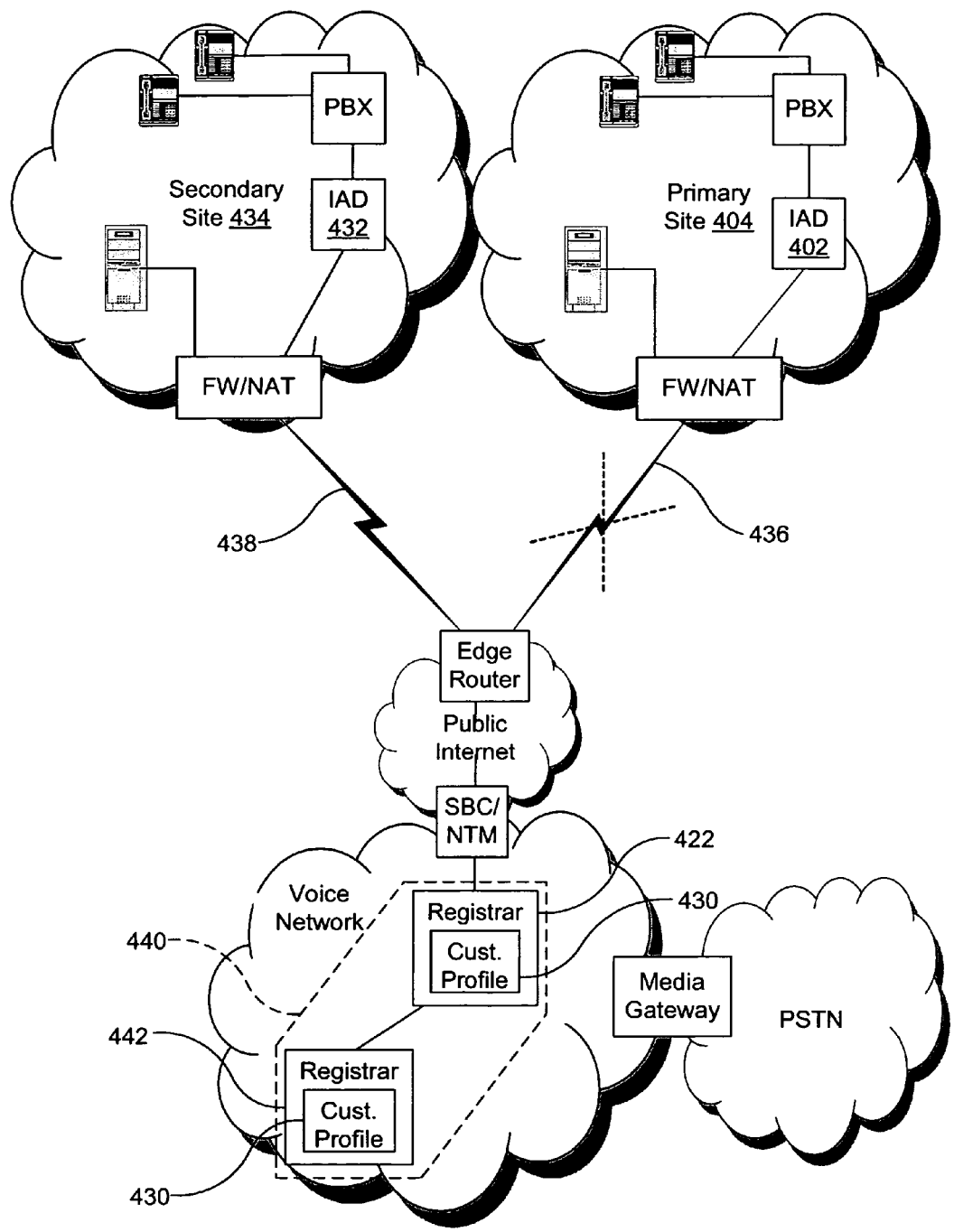
FIG. 4 illustrates yet another exemplary network configuration having an integrated access device at each of multiple sites and multiple registrars in a voice network in accordance with embodiments of the present invention.

Exemplary systems in which Active/Stand, round robin, and PSTN route advance options can be employed are illustrated in FIGS. 2-4 and are discussed in more detail below.

Caller-id Configuration of the customer profile 130 specifies caller-id preferences of the customer. Customers may want to allow certain levels of caller-id to be propagated to the PSTN 114. To satisfy this, in a SIP environment, the registrar 122 includes functionality to populate certain fields in signaling messages, in accordance with the caller-id configuration. These fields may include universal resource identifiers (URIs) in both "Remote-party-id and From." This field will also contain a calling name (CNAM) option if the customer subscribes to this capability.

In accordance with various embodiments, outbound caller-id can be delivered in three methods: main number, TN of the calling voice communication device, and anonymous. In the "main number" approach, a main number associated with the customer is used for the caller-id information. The main number can be obtained from the customer profile, for example from the unique IAD tag or ID. As discussed herein, the customer can have multiple IADs and each of these IADs will be associated with a unique tag. As such, in one embodiment, the caller-id number is provisioned separately. In the first method, the main number is inserted in the URI of the remote-party-id field before the Invite Message is sent to the central routing authority.

The following are exemplary Invite messages (including only relevant fields, for ease of illustration) that might be generated using the main number method Ingress INVITE to the registrar:

INVITE sip:+130305551212@65.56.80.213:5060 SIP/2.0
Via: SIP/2.0/UDP 65.56.80.120:5060;branch=z9hG4bK23C0
From: "Level 3 Broomfield"<sip:7208881000@65.56.80.120>;tag=4CE929B2-11F1
To: <sip:+13035551212@65.56.80.213>
Contact: <sip:7208881143@65.56.80.120:5060>
Remote-Party-tag:
<sip:7208881143@65.56.80.120>;party=calling;screen=no;privacy=off
Outbound INVITE from the registrar:

INVITE sip:+130305551212@65.56.80.213:5060 SIP/2.0
Via: SIP/2.0/UDP 65.56.80.120:5060;branch=z9hG4bK23C0
From: "Level 3 Broomfield"<sip:7208881000@65.56.80.120>;tag=4CE929B2-11F1
To: <sip:+13035551212@65.56.80.213>
Contact: <sip:7208881143@65.56.80.120:5060>
Remote-Party-tag:
<sip:7208881000@65.56.80.120>;party=calling;screen=no;privacy=off The following fields are example fields for caller-id in the customer profile 130, which might be associated with the main number approach:

```
<Caller-ID>
Caller-id - MAIN
Main Number - 7208881000
CNAM - TRUE/FALSE
```

The next method involves using the TN associated with the device from which the call originated from. This TN is also referred to as the quasi-registered access number associated with the IAD from which the Invite message came. The TN of the calling device is included in the "Contact" header of the Invite message. The user part of the "Contact" header is placed into the user part of the "From" header. In the second method, the remote-party-id field will already have the individual TN, and remains unchanged by the registrar, or voice distribution server.

The following are exemplary Invite Messages (including only relevant fields for ease of illustration) that may be generated using the calling TN approach:

Ingress INVITE to the registrar:

INVITE sip:+130305551212@65.56.80.213:5060 SIP/2.0
Via: SIP/2.0/UDP 65.56.80.120:5060;branch=z9hG4bK23C0
From: "Level 3 Broomfield"<sip:7208881000@65.56.80.120>;tag=4CE929B2-11F1
To: <sip:+13035551212@65.56.80.213>
Contact: <sip:7208881143@65.56.80.120:5060>
Remote-Party-tag:
<sip:7208881143@65.56.80.120>;party=calling;screen=no;privacy=off
Outbound INVITE from the proxy:

INVITE sip:+130305551212@65.56.80.213:5060 SIP/2.0
Via: SIP/2.0/UDP 65.56.80.120:5060;branch=z9hG4bK23C0
From: "Level 3 Broomfield"<sip:7208881143@65.56.80.120>;tag=4CE929B2-11F1
To: <sip:+13035551212@65.56.80.213>
Contact: <sip:7208881143@65.56.80.120:5060>
Remote-Party-tag: <sip:7208881143@65.56.80.120>;
    party=calling;screen=no;privacy=off The following are exemplary fields for caller-id in the customer profile 130, which may be associated with the calling TN approach:

```
<Caller-ID>
Caller-id - TRUE
Main Number -
CNAM - TRUE/FALSE
```

The third method, or anonymous method, removes all calling information from the Invite message and inputs "anonymous" in the "From" field. In addition, if a remote-party-id header exists, it is altered appropriately. The following are exemplary Invite Messages (including only relevant fields for ease of illustration), which may be generated using the anonymous method:

Ingress INVITE to the registrar:

INVITE sip:+130305551212@65.56.80.213:5060 SIP/2.0
Via: SIP/2.0/UDP 65.56.80.120:5060;branch=z9hG4bK23C0
From: "Level 3 Broomfield"<sip:7208881000@65.56.80.120>;tag=4CE929B2-11F1
To: <sip:+13035551212@65.56.80.213>
Contact: <sip:7208881143@65.56.80.120:5060>
Remote-Party-tag: <sip:7208881143@65.56.80.120>;
    party=calling;screen=no;privacy=off
Outbound INVITE from the registrar:

INVITE sip:+130305551212@65.56.80.213:5060 SIP/2.0
Via: SIP/2.0/UDP 65.56.80.120:5060;branch=z9hG4bK23C0
From: "Anonymous"<sip:anonymous@anonymous.invalid>;
    tag=4CE929B2-11F1
To: <sip:+13035551212@65.56.80.213>
Contact: <sip:65.56.80.120:5060>
Remote-Party-tag: <sip:anonymous@anonymous.invalid>;
    party=calling;screen=yes;privacy=yes The following fields are example fields for caller-id in the customer profile 130, which may be associated with the anonymous approach:

```
<Caller-ID>
Caller-id - FALSE
Main Number -
CNAM - TRUE/FALSE
```

The 911 Configuration field of the customer profile 130 designates 911 customer preferences. The 911 Configuration field generally includes static emergency routing information. In one particular embodiment, the 911 configuration field can include a variable field for customer ESRN information. To establish a 911 call, a 911 proxy (not shown) uses the user part of the "From" field to as identification of the customer to a public safety answering point (PSAP). In some states, the actual station number, which originates a 911 call, be included in the "From" field for identification purposes. In other states and per customer's request, the main number of the customer is used for 911 identification. This configuration designates the appropriate information to be populated in the correct fields.

Accordingly, the 911 configuration can specify, and can be used to determine the information sent to the PSAP for caller-id purposes and identifying the customer site. The 911 configuration is directly related to caller-id, which is described above. In one embodiment, the 911 configuration can be employed using two methods. The first method is referred to as the main number method, and involves delivering the provisioned main number to the PSAP. The second method is referred to as the calling TN approach, and involves delivering the calling TN (or quasi-registered access number), which sourced the 911 call to the PSAP.

In accordance with various embodiments, the main number method is applicable if only the main number for the customer has been provisioned in the subscriber line database. In certain embodiments, the calling TN approach will be used for the customer if every associated TN has been provisioned in the subscriber line database. The main number method is a likely scenario when blocks of TNs are provisioned for the customer. In some embodiments, PS-ALI (Private Switch-ALI) can provide 911 caller-id information appropriately to the PSAP.

The following Invite messages include relevant fields for ease of explanation, which may be used in accordance with the main number method:

```
Ingress INVITE to the registrar

INVITE sip:911@65.56.80.213:5060 SIP/2.0
Via: SIP/2.0/UDP 65.56.80.120:5060;branch=z9hG4bK23C0
From: "Level 3 Broomfield"
    <sip:7208881000@65.56.80.120>;tag=4CE929B2-11F1
To: <sip:911@65.56.80.213>
Contact: <sip:7208881143@65.56.80.120:5060>
Remote-Party-tag: <sip:7208881143@65.56.80.120>;
    party=calling;screen=no;privacy=off
Outbound INVITE from the registrar:

INVITE sip:911@65.56.80.213:5060 SIP/2.0
Via: SIP/2.0/UDP 65.56.80.120:5060;branch=z9hG4bK23C0
From: "Level 3 Broomfield"
    <sip:7208881000@65.56.80.120>;tag=4CE929B2-11F1
To: <sip:911@65.56.80.213>
Contact: <sip:7208881143@65.56.80.120:5060>
Remote-Party-tag: <sip:7208881000@65.56.80.120>;
    party=calling;screen=no;privacy=off
```

The following are example fields for caller-id in the customer profile:

```
            <911>
            Caller-id - MAIN
            Main Number - 7208881000
```

The following message fields are exemplary Invite messages (including only relevant fields for ease of illustration), which may be associated with of the calling TN method:

```
Ingress INVITE to the registrar:

INVITE sip:911@65.56.80.213:5060 SIP/2.0
Via: SIP/2.0/UDP 65.56.80.120:5060;branch=z9hG4bK23C0
From: "Level 3 Broomfield"
<sip:7208881000@65.56.80.120>;tag=4CE929B2-
11F1
To: <sip:911@65.56.80.213>
Contact: <sip:7208881143@65.56.80.120:5060>
```

```
-continued

Remote-Party-tag: <sip:7208881143@65.56.80.120>;
    party=calling;screen=no;privacy=off
Outbound INVITE from the registrar:

INVITE sip:911@65.56.80.213:5060 SIP/2.0
Via: SIP/2.0/UDP 65.56.80.120:5060;branch=z9hG4bK23C0
From: "Level 3 Broomfield"
    <sip:7208881143@65.56.80.120>;tag=4CE929B2-11F1
To: <sip:911@65.56.80.213>
Contact: <sip:7208881143@65.56.80.120:5060>
Remote-Party-tag: <sip:7208881143@65.56.80.120>;
    party=calling;screen=no;privacy=off
```

The following fields are example fields for 911 configuration in the customer profile 130:

```
            <911>
            Caller-id - TRUE
            Main Number -
            ESRN -
```

The Customer Information of the profile 130 is primarily for operational identification. while reviewing customer profiles. It could also be used to provide information to a channel partner via a graphical user interface (GUI). In one embodiment, the customer information contains the following information:

Customer name

Customer location

IAD brand and model

A diagram of an exemplary software implementation of a customer profile, and related objects, is shown and described below with respect to FIG. 5.

In general, as will be understood by those skilled in the art, the fields or types of data stored in the customer profile may be updated over time, as standards and technologies change. For example, the definition of the 911 configuration field may be updated over time as the Enhanced 911 (E911) standards change. Currently, the National Emergency Number Association (NENA) sets forth requirements, standards, and/or guidelines to direct Voice Over IP (VOIP) service providers in deploying E911 services. For example, NENA recently issued the "i2 E911" service standard. The principles described herein can be broadly applied, even though standards and technologies may change. Advantageously, because customer profile data is contained at a common location (e.g., a network registrar), all customer profile field definitions, including the 911 configuration field, may be modified over time to accommodate any changes that may come along.

In addition, various exemplary messages (e.g., INVITE and REGISTER messages) are shown and described above for illustrative purposes. As shown above the messages generally follow the RFC 3261 definition of SIP. It will be understood by those of skill in the art that messages can be adapted and modified as standards and technologies evolve, without straying from the scope of the invention as defined in the claims recited below. Thus, for example, when extensions to the SIP definition are generated, various fields in the SIP messages may be moved, added, or deleted as appropriate, while still applying the same useful and novel principles described herein.

FIG. 2 illustrates an exemplary operating environment 200 that includes a secondary IAD 232. In this embodiment the environment 200 includes a primary, or active, IAD 202 and secondary IAD 232, also referred to as a standby or redundant IAD 232. The standby IAD 232 can be local or remote with respect to the primary IAD 204 and/or the customer network 204. The primary IAD 202 and the standby IAD 232 generally perform similar functions, but the standby IAD 232 is typically only resorted to when the primary IAD 202 fails.

In this particular embodiment, both the primary IAD 204 and the standby IAD 232 register with the voice services network 224. For example, using SIP protocol, the primary IAD 204 and the standby IAD 232 send identification information to the registrar 222 in the form of a register message. The identification information indicates which IAD takes precedence when routing calls. The relevant portions of two exemplary register messages are shown below:

---

Primary IAD 202

REGISTER sip:64.156.41.130:5060 SIP/2.0
Method: REGISTER
From: "Level 3 Broomfield"<sip:7208881000@64.156.41.130:5060;
    user=phone>
To: <sip:7208881000@64.156.41.130:5060;user=phone>
Call-tag: 94512fa0-6904-515472-30928383-136903408200069301010000-
0@10.1.69.127
CSeq: 1 REGISTER
Contact: <sip:7208881000@10.1.69.127:5060;transport=UDP;
    user=phone>
Contact: <sip:7208881000@10.1.69.128:5060;transport=UDP;
    user=phone; q=0.5>
Expires: 30
Content-Length: 0

Secondary IAD 232

REGISTER sip:64.156.41.130:5060 SIP/2.0
Method: REGISTER
From: "Level 3 Broomfield"<sip:7208881001@64.156.41.130:5060;
    user=phone>
To: <sip:7208881001@64.156.41.130:5060;user=phone>
Call-tag: 94512fa0-6904-515472-30928383-136903408200069301010000-
0@10.1.69.127
CSeq: 1 REGISTER
Contact: <sip:7208881001@10.1.69.128:5060;transport=UDP;
    user=phone; q=0.5>
Contact: <sip:7208881001@10.1.69.127:5060;transport=UDP;
    user=phone>
Expires: 30
Content-Length: 0

---

In both of the foregoing exemplary REGISTER messages, the Active preference is the IAD with IP address of 10.1.69.127 (i.e., the primary IAD 202). The 'q' parameter is specified in International Engineering Task Force (IETF) Request For Comments (RFC) 2616. In embodiments described here, the value of 'q' indicates which IAD is to be primary and which IAD is secondary. In the example shown above, a 'q' value of 0.5 corresponds to a lower priority, secondary IAD. Other 'q' values may be used in any particular embodiment. The registrar 222 is able to recognize the 'q' value (e.g., q=0.5) and place the routes in the specific order according to the preference. In one embodiment, the registrar 222 creates a route selection entry in the customer's profile 230 as follows:

<Route Selection>
   10.1.69.127-A
   10.1.69.128-S

With further regard to the customer profile 230 in a multiple IAD configuration, each IAD is typically registered with a different unique IAD tag. Reference is made again to the above example, in which the customer has a TN range of (720) 888-1000-(720) 888-1999. In this example, in a multiple IAD configuration, the primary IAD 202 may be set to the first number in the range (i.e., 7208881000), and the secondary IAD 232 may be set to the second number in the range (i.e., 7208881001). In this way, each IAD can be uniquely identified when calls are routed.

FIGS. 2-3 illustrate configurations that can both provide for the Active/Standby routing option. The Active/Standby route option has the function of Primary Always; however, it has the ability to fail signaling to a Standby IAD. Thus, for example, with regard to FIG. 2, IAD 202 may be Primary Always, except when it fails. When IAD 202 fails, IAD 232, the standby IAD, can handle communications instead. The standby IAD 232 could be located in the same site (as shown in FIG. 2) or a regionally diverse location (as shown in FIG. 3). As discussed above, in the case of a active/standby routing, both IAD's 202, 232 will provide a REGISTER message. A 'q' value will be added to the "Contact" headers in the REGISTER message to specify precedence in routing. FIGS. 2-3 illustrate network configurations providing the Active/Standby routing option.

FIG. 3 illustrates another exemplary operating environment 300 with an active or primary IAD 302 and a standby or secondary IAD 332. In this embodiment, the IADs are regionally diverse. That is, primary IAD 302 is located at a primary customer network site 304, while secondary IAD 332 is located at secondary customer network site 334. Thus, the configuration shown in FIG. 3 may be referred to as regionally diverse and/or active/standby.

In multi-site customer environments and redundant IAD configurations (e.g., environment 200 and environment 300), the customer profile (e.g., customer profile 230 or 330) references both the primary IAD IP address and the secondary or redundant IAD IP address. If connection 336 to primary IAD 302 fails, as shown with dotted crossed lines, or the IAD 302 fails, communications can be sent to the customer via the secondary IAD 332.

FIG. 4 illustrates another operating environment 400 in an active/standby, regionally diverse IAD configuration. As in FIG. 3, primary or active IAD 402 is located at primary customer network site 404, while secondary or standby IAD 432 is located at secondary customer network site 434. The embodiment of FIG. 4 differs from that of FIG. 3 in that multiple registrars are included in the embodiment of FIG. 4. In this particular embodiment, the voice services network 424 includes multiple registrars. For example, a registrar pair 440 includes a primary registrar 422 and secondary registrar 442.

In one embodiment including a registrar pair 440, the primary registrar 422 references the secondary registrar 442 in situations where there is a failure with the primary IAD 402, or the route 436 to the primary IAD 402. Thus, the standby IP address that is stored by the primary registrar 422 is the IP address of the secondary registrar 442. When the primary IAD 402 fails, the primary registrar 422 uses the IP address of the secondary registrar 442. For example, in the SIP protocol, upon receipt of a "408 timeout" or other route failure indication in response to an INVITE message being sent to the primary IAD 402, the primary registrar 422 sends the INVITE message to the secondary registrar 442. The secondary registrar 442 responds with a "302" message identifying a route 438 to the standby IAD 432. The primary registrar 422 will then signal to the standby IAD 432.

SIP REGISTER messages can take the same general format as those shown above for the first example of an Active/Standby configuration (e.g., FIG. 2) described above. A central routing authority (not shown) in communication with the registrar pair 440 routes register messages to the primary provisioned registrar 422. If multiple alternative routes to the customer sites exist, as is illustrated in FIG. 4, the registrars 422, 436 handle the new route changes on a temporary basis. Because IAD 402 is designated as primary, the route selection table for the customer profile 430 should not have route 438 choice as the primary option. In this embodiment, route 438 will be selected only temporarily when route 436 fails.

The customer may request that the standby IAD 432 become the primary IAD for TN's located on the prior primary site 404. If this happens, then the central routing authority will be provisioned with a new registrar pair that reflects the change. The prior primary IAD 402 and prior primary server will be changed to reflect themselves as a standby choice or removed entirely from the route selection.

With regard to the embodiment illustrated in FIG. 4, various routing options may be employed. Two options are the Round Robin and PSTN route advance options mentioned above with respect to the "customer delivery method" of the customer profile. In the Round Robin routing option, both IAD's are considered Active. Another way to describe round robin routing is Active/Active. New ingress signaling instances from the PSTN will route alternating between the two IAD's. The registrar 422 receive REGISTER messages from both IAD's 402, 436, but the 'q' value will be equal between the two IAD's. To differentiate the REGISTER messages, the tag is unique to the individual IAD as described previously. The following is an example of the two IAD's REGISTER messages:

---

Primary IAD 402

REGISTER sip:64.156.41.130:5060 SIP/2.0
Method: REGISTER
From: "Level 3 Broomfield"
    <sip:7208881000@64.156.41.130:5060;user=phone>
To: <sip:7208881000@64.156.41.130:5060;user=phone>
Call-tag: 94512fa0-6904-515472-30928383-
    13690340820006930101000-0@10.1.69.127
CSeq: 1 REGISTER
Contact: <sip:7208881000@10.1.69.127:5060;
    transport=UDP;user=phone>
Contact: <sip:7208881000@10.1.69.128:5060;
    transport=UDP;user=phone>
Expires: 30
Content-Length: 0

Secondary IAD 432

REGISTER sip:64.156.41.130:5060 SIP/2.0
Method: REGISTER
From: "Level 3 Broomfield"
    <sip:7208881001@64.156.41.130:5060;user=phone>
To: <sip:7208881001@64.156.41.130:5060;user=phone>
Call-tag: 94512fa0-6904-515472-30928383-13690340820006930101000-
0@10.1.69.127
CSeq: 1 REGISTER
Contact: <sip:7208881001@10.1.69.128:5060;
    transport=UDP;user=phone>
Contact: <sip:7208881001@10.1.69.127:5060;
    transport=UDP;user=phone>
Expires: 30
Content-Length: 0

---

In this particular scenario, the registrar 422 includes an entry in the customer's profile 430 with a route selection such as the following:

<Route Selection>
1. 10.1.69.128-A
2. 10.1.69.127-A

With regard to PSTN Route Advance routing calls can be routed from the voice network 424 to a PSTN number for the specified customer. Typically, this would only occur if all IAD options for the customer were unavailable. Additionally, future capabilities should expect to be able to accomplish this level of routing on a per customer TN basis. PSTN Route Advance may be employed in cases of disaster recovery. The registrar 422 includes an entry in the customer's profile with a route selection such as the following:

<Route Selection>
1. 10.1.69.128-A
2. 10.1.69.127-A
3. +18004538353-P

In one embodiment, the PSTN route advance option is a variable entry. It will be configured as an alternative to existing IAD route options only. In one embodiment, the routing option is never a primary always option. The registrar 422 differentiates between IP address (IAD) route options and an e.164 address. There should only be one e.164 address route option, as this is considered a last resort route. The proxy will try the IP address routes first, and only upon 408 timeout response or similar failure forward to the PSTN route.

Figure 5:
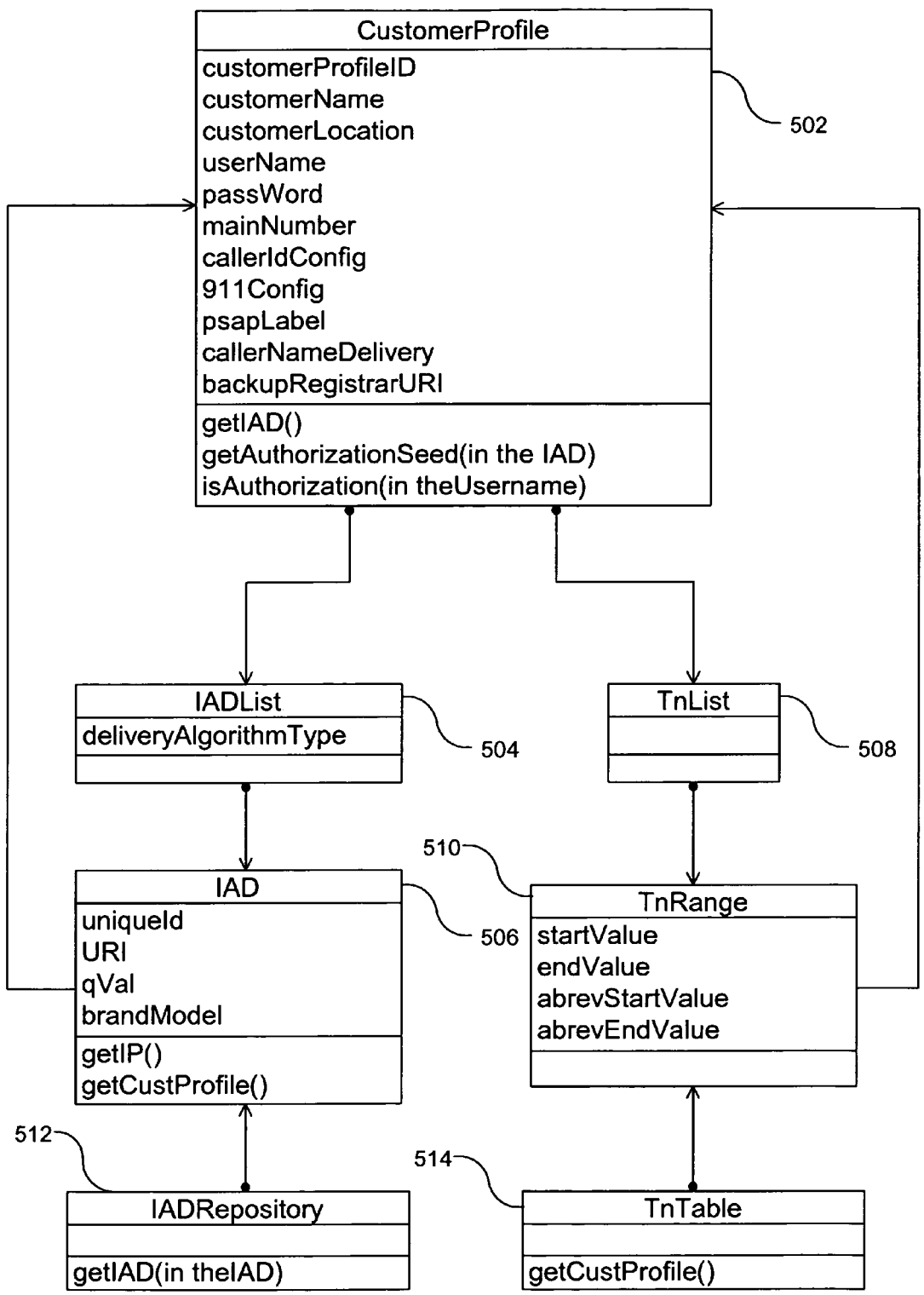
FIG. 5 is a logical data diagram illustrating data and functional constructs in accordance with various embodiments of the present invention.

FIG. 5 is an object diagram illustrating functional objects that may be implemented in a registrar. Each object includes data and functions. The objects can be related in a number of ways. For example, one object may have another object, or may use another object. The objects are typically implemented in software.

A customer profile object 502 includes data and functions related to a customer profile. For example, the exemplary customer profile object 502 includes variables customerProfileID, customerName, customerLocation, username, password, mainNumber, callerIdConfig, 911Config, psapLabel, callerNameDelivery, and backupRegistratrarURI. The customer profile object 502 includes functions getIAD, getAuthorizationSeed, and isAuthorization.

The customer profile object 502 uses and IADlist object 504, which points to one or more IAD objects 506. The IADList object 504 includes a variable deliveryAlgorithmType specifying the manner in which IAD objects 506 are to be delivered when getIAD is called. Each IAD object 506 includes data fields uniqueId, URI, qVal, brandModel. Each IAD object 506 includes functions getIP, and getCustProfile.

CustomerProfile object 502 also refers to a telephone number list, TnList object 508. TnList object 508 refers to TnRange object 510, which specifies a range of telephone numbers. TnRange object 510 includes variables startValue, endValue, abrevStartValue, abrevEndValue. An IADRepository object 512 references one or more IAD objects 506, and includes a function getIAD, which returns a specified IAD. Another object, TnTable object 514 references one or more TnRange objects 510, and provides a function getCustProfile, which returns a CustomerProfile object 502 related to a telephone number range.

Figure 6:
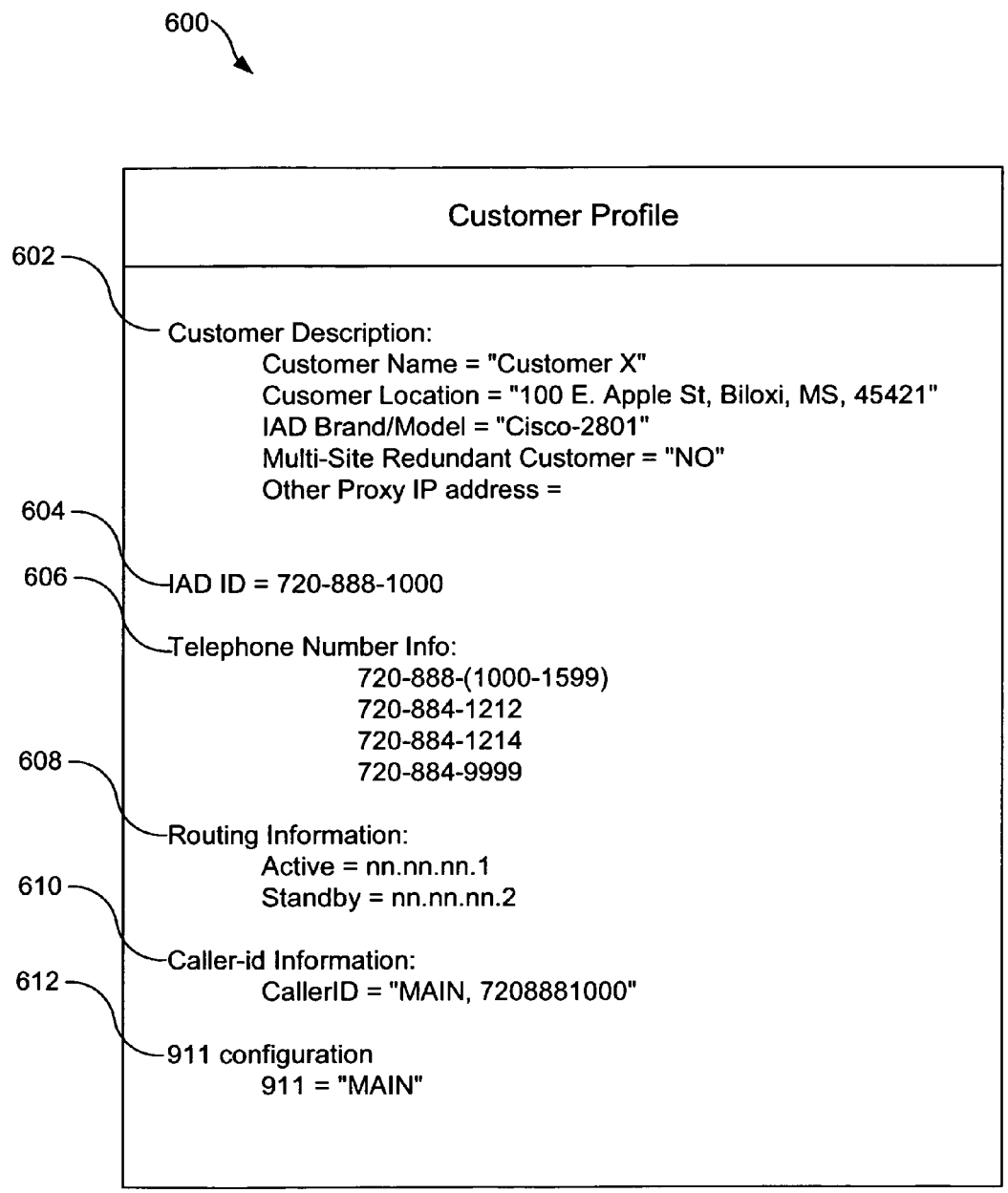
FIG. 6 is a data diagram illustrating one particular example of a customer profile in accordance with some embodiments of the customer profile of FIG. 5.

FIG. 6 illustrates an exemplary customer profile 600 in accordance with an embodiment of the present invention. The particular data shown in the customer profile 600 is for illustrative purposes and is not intended to limit the invention to the particular data shown. A customer description section 602 provides general information about the customer, such as name, location, IAD brand, and whether there is multi-site IAD redundancy. An IAD ID field 604 provides the IAD identifier. As discussed above, in some embodiments, the IAD ID field 604 can take on a value of one of the telephone numbers in the telephone number range.

A telephone number section 606 includes the telephone numbers associated with the IAD. In the particular example of FIG. 6, the telephone number range is discontiguous. The telephone numbers in the telephone number section are referred to as quasi-registered telephone numbers, because they are registered as a group with a single registration of the IAD. A routing information section 608 provides routes to active and standby IADs. The routes may be specified as IP addresses.

A caller-id information section 610 provides information related to caller id preferences. In the particular example, the caller id is specified as the customer as the main IAD number. Similarly, in a 911 configuration field 612, the customer has specified the main number for 911 purposes.

The particular exemplary data shown in the fields of the customer profile 600 of FIG. 6 is for illustrative purposes only, and is not intended to limit the scope of the invention. For example, the IAD Brand/Model is not limited to "Cisco-2801", but rather could be any brand and model of IAD known in the industry that may be used by the customer. As another example, the particular telephones numbers shown in the customer profile are merely to illustrate how one skilled in the art could arrange telephone numbers in the profile according to one embodiment. In this and other embodiments, the telephone numbers would be different from those shown, depending on the particular customer(s).

Exemplary Operations

Figure 7:
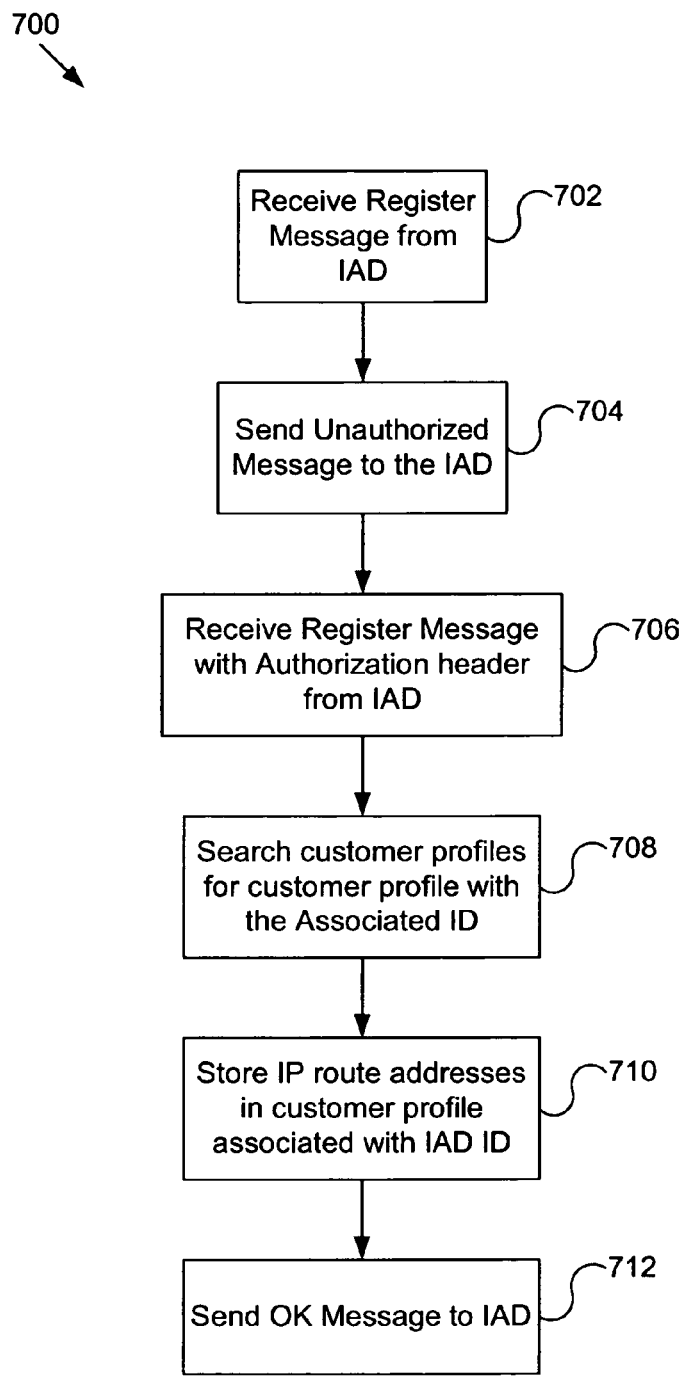
FIG. 7 is a flowchart illustrating an algorithm that may be carried out by a registrar, or voice distribution server, for registering an integrated access device (IAD)

FIG. 7 is a flowchart illustrating an algorithm 700 that may be carried out by a registrar, or voice distribution server, for registering an integrated access device (IAD). It is assumed, for illustrative purposes, that in this embodiment a SIP protocol is being used over a VoIP network. However, the invention is not limited to such as environment. The algorithm 700 occurs when an IAD registers with the voice distribution server. The algorithm may be carried out multiple times per a unit time, depending on design considerations of a particular communication network.

Initially, in a receiving operation 702, the voice distribution server receives a Register Message from the IAD. As discussed above, the Register Message typically includes a number of fields, such as, but not limited to, a "From" field, a "To" field, a "Call-tag" field, a "Contact" field, and an "Expires" field. In general, the Register Message identifies the IAD with an identifier, such as a telephone access number (e.g., in the "From"). The "Contact" field specifies one or more IP addresses associated with the IAD.

In a sending operation 704, the voice distribution server may optionally send an Unauthorized Message to the IAD. In response to an unauthorized message, the IAD sends an authorization header with username and password. Assuming the username and password are valid, the voice distribution server performs a searching operation 708, in which customer profiles are searched for a customer profile having an IAD ID matching the IAD ID received from the registering IAD.

After the voice distribution server finds the corresponding customer profile, IP addresses from the "Contact" field are copied into the "Route Selection" field of the customer profile in a storing operation 710. In a sending operation, the voice distribution server sends an OK message to the registering IAD, indicating that the registration was successful.

Figure 8:
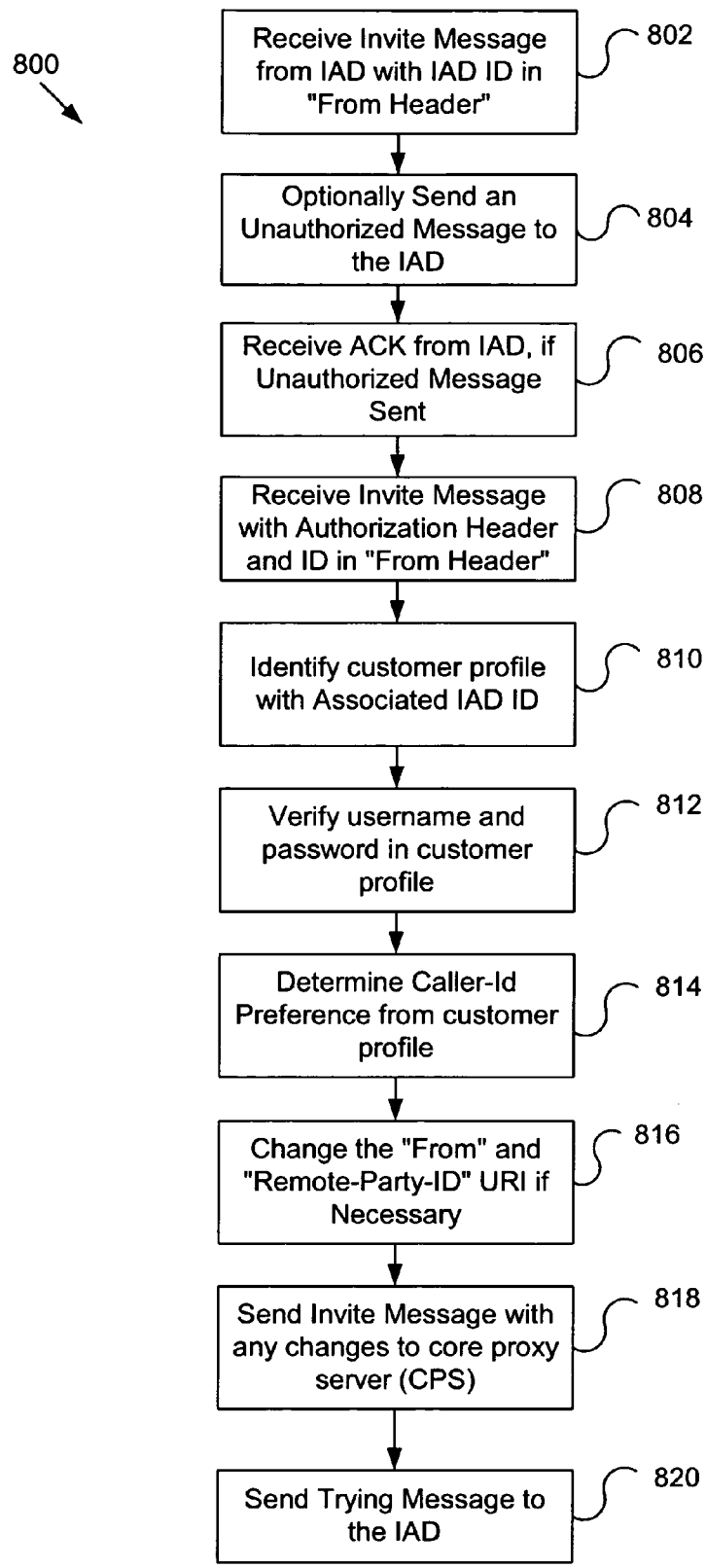
FIG. 8 is a flowchart illustrating an algorithm that may be carried out by a registrar, or voice distribution server, for handling an invitation from an IAD to establish a communication session.

FIG. 8 is a flowchart illustrating an algorithm 800 that may be carried out by a registrar, or voice distribution server, for handling an invitation from an IAD to establish a communication session to an endpoint on the PSTN. It is assumed in this embodiment that SIP protocol is used over a VoIP network. It is also assumed that the IAD has previously registered in a registration process such as that described above in FIG. 7.

Prior to the voice distribution server handling a call invitation, the IAD receives an Invite Message from a voice communication device via a PBX. The IAD inserts its IAD ID in the "From" field of the Invite Message and sends the Invite Message to the voice distribution server.

In a receiving operation 802, the voice distribution server receives the Invite Message from the IAD, including the IAD ID in the "From" field. The voice distribution server may responsively send an Unauthorized Message to the IAD in a sending operation 804. In a receiving operation 806, the voice distribution server receives and "ACK" message from the IAD if the unauthorized message was issued. In another receiving operation 808, the voice distribution server receives an authorization header including username and password from the IAD.

The voice distribution server identifies the corresponding customer profile in identifying operation 810. In a verifying operation 812, the voice distribution server verifies the username and password in the customer profile. In a determining operation 814, the voice distribution server determines caller-ID preference based on the caller-ID field in the customer profile. Based on the Caller-ID preference, the voice distribution server may perform a changing operation 816 in which the "From" and "Remote-Party-ID" URI are changed.

In a sending operation 818, the voice distribution server sends the Invite Message, with any necessary changes to the core proxy server, for delivery to a media gateway and onto the PSTN. The voice distribution server then receives a Trying Message, and responsively sends a Trying Message to the IAD in another sending operation 820. If the call is successfully established, a standard real time protocol communication session will then proceed in the standard fashion.

Figure 9:
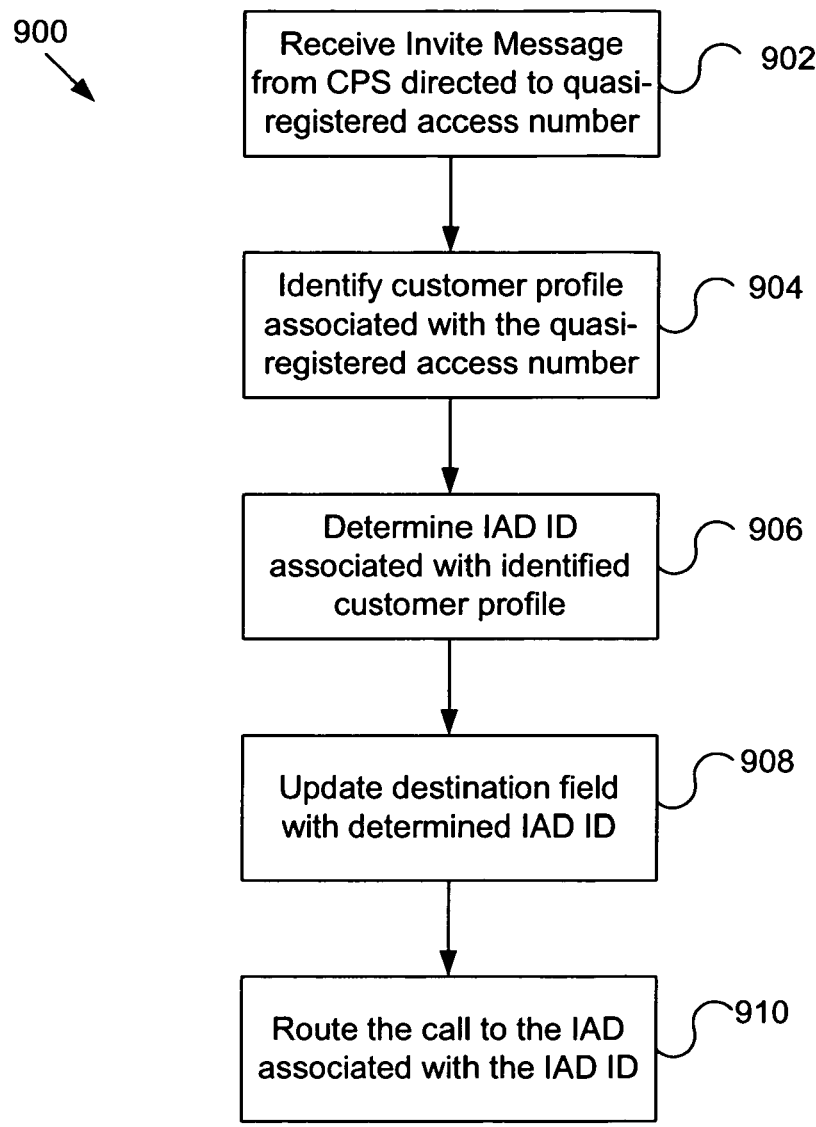
FIG. 9 is a flowchart illustrating an algorithm that may be carried out by a registrar, or voice distribution server, for handling an invitation from a central routing authority, such as a core proxy server (CPS), to establish a communication session with a voice device associated with an IAD.

FIG. 9 is a flowchart illustrating an algorithm 900 that may be carried out by a registrar, or voice distribution server, for handling an invitation from a central routing authority, such as a core proxy server (CPS), to establish a communication session with a voice device associated with an IAD. It is assumed that the invitation came from a media gateway, based on a call attempt from the PSTN. Again, it is assumed that a SIP protocol is used over a VoIP network, but the invention is not so limited. In addition, it is assumed that the relevant IAD has previously registered with the voice distribution server.

In a receiving operation 902, the voice distribution server receives the Invite message from the central routing authority. The Invite message includes information designating a quasi-registered access number, to which the call is directed. The quasi-registered access number is associated with an IAD ID. Thus, the voice distribution server performs an identifying operation 904, which identifies a customer profile associated with the quasi-registered access number. The identifying operation 904 may involve searching multiple customer profiles for a quasi-registered access number that matches the quasi-registered access number designated in the Invite message.

In a determining operation 906, the voice distribution server determines the IAD ID associated with the identified customer profile. In an updating operation 908, the voice distribution server updates the destination field of the Invite message with the determined IAD ID. The updating operation 908 may involve retrieving route selection information from the customer profile and copying the route selection information into the destination field. In a routing operation 910, the voice distribution server routes the call to the IAD associated with the IAD ID. The routing operation 910 may involve sending the updated Invite message to the IAD.

Exemplary General-Purpose Computer

Embodiments of the present invention include various steps, which were described in more detail above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, an example of a computer system includes at least one processor, at least one communication port, a main memory, a read only memory, a mass storage, a bus, and a removable storage media 740.

Processor(s) can be any know processor, such as, but not limited to, an Intel.RTM. Itanium.RTM. or Itanium 2.RTM. processor(s), or AMD.RTM. Opteron.RTM. or Athlon MP.RTM. processor(s), or Motorola.RTM. lines of processors. Communication port(s) can be any of an RS-232 port for use with a modem based dialup connection, a 10/100 Ethernet port, or a Gigabit port using copper or fiber. Communication port(s) may be chosen depending on a network such a Local Area Network (LAN), Wide Area Network (WAN), or any network to which the computer system connects.

Main memory can be Random Access Memory (RAM), or any other dynamic storage device(s) commonly known in the art. Read only memory can be any static storage device(s) such as Programmable Read Only Memory (PROM) chips for storing static information such as instructions for processor.

Mass storage can be used to store information and instructions. For example, hard disks such as the Adaptec.RTM. family of SCSI drives, an optical disc, an array of disks such as RAID, such as the Adaptec family of RAID drives, or any other mass storage devices may be used.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A calling network for accepting voice and data information, the calling network comprising:
   a voice distribution server, wherein the voice distribution server is communicably coupled to an integrated access device, wherein the voice distribution server includes a processor and a computer readable medium, and wherein the computer readable medium includes a customer profile;
   the customer profile including at least one registered access identification associated with the integrated access device, and a plurality of quasi-registered access numbers associated with the integrated access device;
   the customer profile further including a customer description, routing information, caller-id information, and an emergency call configuration;
   the processor configured to route calls directed to and from the quasi-registered access numbers by carrying out a process comprising:
   receiving a call indicating one of the plurality of quasi-registered access numbers in an origination field;
   inserting the integrated access device identification in the origination field;
   inserting the quasi-registered access number in a routing field;
   sending an invitation message with an authorization header and identification in the invitation message;
   determining which customer profile is associated with the quasi-registered access number;
   accessing the determined customer profile;
   verifying a username and password associated with the determined customer profile;
   following the caller-id preference designated by the determined customer profile;
   determining if the call is an emergency call;
   following emergency call configuration indicated in the determined customer profile if the call is an emergency call;
   sending a trying message to the integrated access device;
   changing the origination field and remote party identification field;
   sending an adapted invitation message; and
   continuing with a standard call flow.

2. The calling network of claim 1, wherein at least one of the quasi-registered access numbers is discontiguous from another one of the quasi-registered access numbers.

3. The calling network of claim 1, wherein the computer readable medium is a first computer readable medium; wherein the integrated access device is communicably coupled to a plurality of voice communication devices; wherein the quasi-registered access numbers are associated with respective ones of the plurality of voice communication devices; wherein the integrated access device is associated with a second computer readable medium, and wherein the second computer readable medium includes instructions executable by the integrated access device to register the plurality of voice communication devices with the calling network using a unified registration request.

4. The calling network of claim 1, wherein the routing information specifies a routing option selected from a group consisting of primary always option, active/standby option, round robin option, and PSTN route advance option.

5. The calling network of claim 1, wherein the processor is further configured to:
   receive another call directed to one of the quasi-registered access numbers;
   identify a customer profile associated with the quasi-registered access number;
   access the identified customer profile;
   access an integrated access device identification from the customer profile;
   update a destination field with the integrated access device identification; and
   route the call to the integrated access device identified by the integrated access device identification.

6. The system calling network of claim 5 wherein the processor is further configured to:
   update a contact field with the original contents of the destination field.

7. A method for registering multiple voice communication devices in relation to a Voice Over IP network, the method comprising:
   providing a voice distribution server, wherein the voice distribution server is communicably coupled to an integrated access device, wherein the voice distribution server is associated with a computer readable medium, wherein the computer readable medium includes a customer profile, and wherein the customer profile includes at least one registered identification associated with the integrated access device, and at least two quasi-registered access numbers associated with the integrated access device;
   registering the customer profile associated with the integrated access device;

receiving a call directed to one of the quasi-registered access numbers;
identifying a customer profile associated with the quasi-registered access number;
accessing the identified customer profile;
accessing an integrated access device identification from the identified customer profile;
updating a destination field with the integrated access device identification;
routing the call, according to a routing preference indicated in the identified customer profile, to the integrated access device identified by the integrated access device identification;
receiving another call wherein the another call indicates one of the plurality of quasi-registered access numbers in an origination field;
inserting the integrated access device identification in the origination field;
inserting the quasi-registered access number in the routing field;
sending an invitation message with an authorization header and identification in the invitation message;
determining in the voice distribution server which customer profile is associated with the quasi-registered access number;
accessing the determined customer profile;
verifying a user name and password associated with the customer profile;
following the caller-id preference designated by the customer profile;
determining if the call is an emergency call;
following emergency call configuration indicated in the customer profile if the call is an emergency call;
sending a trying message to the integrated access device;
changing the origination field and remote an identification field;
sending an adapted invitation message; and
continuing with a standard call flow.

8. The method of claim 7, further comprising updating a contact field with the original contents of the destination field.

9. The calling network of claim 1, wherein the integrated access device is a primary integrated access device.

10. The calling network of claim 1, wherein the integrated access device is a secondary integrated access device.

11. The calling network of claim 1, wherein the integrated access identification corresponds to one of the plurality of quasi-registered access numbers.

12. The calling network of claim 1, wherein the integrated access device is configured to register the plurality of quasi-registered access numbers using a unified registration request.

13. The calling network of claim 1, wherein the integrated access device is communicably coupled to a private branch exchange.

14. The calling network of claim 1, wherein the integrated access device is associated with a customer network including a plurality of communication devices associated with respective ones of the quasi-registered access numbers.

15. The calling network of claim 7, wherein the integrated access device is a primary integrated access device.

16. The calling network of claim 7, wherein the integrated access device is a secondary integrated access device.

17. The calling network of claim 7, wherein the integrated access device identification corresponds to one of the at least two quasi-registered access numbers.

18. The calling network of claim 7, wherein the integrated access device is configured to register the at least two quasi-registered access numbers using a unified registration request.

19. The calling network of claim 7, wherein the integrated access device is communicably coupled to a private branch exchange.

20. The calling network of claim 7, wherein the integrated access device is associated with a customer network including a plurality of communication devices associated with respective ones of the quasi-registered access numbers.

* * * * *

UNITED STATES PATENT AND TRADEMARK OFFICE
CERTIFICATE OF CORRECTION

PATENT NO. : 7,440,455 B2
APPLICATION NO. : 11/315644
DATED : October 21, 2008
INVENTOR(S) : Malas et al.

It is certified that error appears in the above-identified patent and that said Letters Patent is hereby corrected as shown below:

At column 22, line 49, in claim 6, after "The" delete "system".

At column 23, line 14, in claim 7, after "call" insert --,--.

At column 23, line 36, in claim 7, delete "an" and insert --party--, therefor.

Signed and Sealed this

Thirty-first Day of March, 2009

JOHN DOLL
*Acting Director of the United States Patent and Trademark Office*